US009433975B2

(12) United States Patent
Chakraborty et al.

(10) Patent No.: US 9,433,975 B2
(45) Date of Patent: Sep. 6, 2016

(54) METHOD OF MAKING A POLYMER/FUNCTIONALIZED NANOGRAPHENE COMPOSITE COATING

(71) Applicants: Soma Chakraborty, Houston, TX (US); Jiang Zhu, Missouri City, TX (US); Gaurav Agrawal, Aurora, CO (US)

(72) Inventors: Soma Chakraborty, Houston, TX (US); Jiang Zhu, Missouri City, TX (US); Gaurav Agrawal, Aurora, CO (US)

(73) Assignee: BAKER HUGHES INCORPORATED, Houston, TX (US)

( * ) Notice: Subject to any disclaimer, the term of this patent is extended or adjusted under 35 U.S.C. 154(b) by 213 days.

(21) Appl. No.: 13/721,320

(22) Filed: Dec. 20, 2012

(65) Prior Publication Data

US 2013/0108800 A1 May 2, 2013

Related U.S. Application Data

(62) Division of application No. 12/707,015, filed on Feb. 17, 2010, now Pat. No. 9,193,879.

(51) Int. Cl.
| | |
|---|---|
| *B05D 5/00* | (2006.01) |
| *B05D 7/00* | (2006.01) |
| *B05D 1/00* | (2006.01) |
| *B05D 1/02* | (2006.01) |
| *B05D 1/18* | (2006.01) |
| *B05D 1/36* | (2006.01) |
| *B05D 3/00* | (2006.01) |
| *B05D 3/06* | (2006.01) |
| *B05D 3/04* | (2006.01) |
| *B05D 3/10* | (2006.01) |
| *B05D 5/08* | (2006.01) |
| *B05D 7/04* | (2006.01) |
| *C09D 7/12* | (2006.01) |
| *C08J 7/04* | (2006.01) |
| *C09D 1/00* | (2006.01) |
| *C09D 5/38* | (2006.01) |
| *B82Y 30/00* | (2011.01) |

(52) U.S. Cl.
CPC ............. *B05D 7/52* (2013.01); *B05D 1/005* (2013.01); *B05D 1/02* (2013.01); *B05D 1/18* (2013.01); *B05D 1/185* (2013.01); *B05D 1/36* (2013.01); *B05D 3/002* (2013.01); *B05D 3/044* (2013.01); *B05D 3/0446* (2013.01); *B05D 3/062* (2013.01); *B05D 3/063* (2013.01); *B05D 3/101* (2013.01); *B05D 5/08* (2013.01); *B05D 7/04* (2013.01); *C08J 7/045* (2013.01); *C09D 1/00* (2013.01); *C09D 5/38* (2013.01); *C09D 7/1216* (2013.01); *C09D 7/1291* (2013.01); *B05D 2505/50* (2013.01); *B82Y 30/00* (2013.01); *C08J 2323/16* (2013.01); *C08J 2433/02* (2013.01); *C08J 2479/02* (2013.01); *Y10S 977/902* (2013.01); *Y10T 428/3154* (2015.04); *Y10T 428/31504* (2015.04); *Y10T 428/31507* (2015.04); *Y10T 428/31511* (2015.04); *Y10T 428/31544* (2015.04); *Y10T 428/31551* (2015.04); *Y10T 428/31663* (2015.04); *Y10T 428/31678* (2015.04); *Y10T 428/31721* (2015.04); *Y10T 428/31786* (2015.04); *Y10T 428/31931* (2015.04); *Y10T 428/31935* (2015.04); *Y10T 428/31938* (2015.04); *Y10T 428/31942* (2015.04)

(58) Field of Classification Search
USPC ...................................... 427/407.1
See application file for complete search history.

(56) References Cited

U.S. PATENT DOCUMENTS

| | | | |
|---|---|---|---|
| 3,404,061 | A | 10/1968 | Shane et al. |
| 4,774,990 | A | 10/1988 | Yamamoto et al. |
| 5,279,873 | A | 1/1994 | Oike |
| 6,882,094 | B2 | 4/2005 | Dimitrijevic et al. |
| 7,048,048 | B2 | 5/2006 | Nguyen et al. |
| 7,112,361 | B2 | 9/2006 | Lynn et al. |
| 7,745,528 | B2 | 6/2010 | Prud'Homme et al. |
| 7,758,841 | B2 | 7/2010 | Billups et al. |
| 8,876,944 | B2 | 11/2014 | Ren et al. |
| 9,115,580 | B2 | 8/2015 | Mazyar et al. |
| 2004/0013597 | A1 | 1/2004 | Mao et al. |
| 2004/0018364 | A1 | 1/2004 | Ota et al. |
| 2004/0053037 | A1 | 3/2004 | Koch et al. |
| 2004/0229983 | A1 | 11/2004 | Winowiecki |

(Continued)

FOREIGN PATENT DOCUMENTS

| | | |
|---|---|---|
| KR | 10-2004-0095581 A | 11/2004 |
| KR | 10-0620615 B1 | 9/2006 |

(Continued)

OTHER PUBLICATIONS

Liu et al., "Graphene-Based Supercapacitor with an Ultrahigh Energy Density," Nano. Lett. 2010, 10, 4863-4868.*

(Continued)

*Primary Examiner* — William Phillip Fletcher, III
(74) *Attorney, Agent, or Firm* — Cantor Colburn LLP (57) ABSTRACT

A method of forming a nano-coating on a substrate comprises: depositing a first layer on a surface of the substrate, the first layer comprising a polymeric composition; depositing a second layer on the surface of the first layer opposite the substrate, the second layer comprising nanographene derivatized with a functional group selected from the group consisting of carboxy, epoxy, ether, ketone, amine, hydroxyl, alkoxy, alkyl, lactones, aryl, functionalized polymeric, functionalized oligomeric groups, and combinations thereof; and repeating the foregoing steps such that multiple alternating layers are formed, wherein each successive occurrence of the first layer is deposited on a previously deposited occurrence of the second layer.

14 Claims, 6 Drawing Sheets

(56) References Cited

U.S. PATENT DOCUMENTS

| | | |
|---|---|---|
| 2005/0001317 A1 | 1/2005 | Ganapathiraman et al. |
| 2005/0070655 A1 | 3/2005 | Van Den Bergen et al. |
| 2005/0161212 A1 | 7/2005 | Leismer et al. |
| 2006/0199770 A1 | 9/2006 | Bianco et al. |
| 2007/0003471 A1 | 1/2007 | Kawabata |
| 2007/0107908 A1 | 5/2007 | Vaidya et al. |
| 2007/0142547 A1 | 6/2007 | Vaidya et al. |
| 2007/0237546 A1 | 10/2007 | Zona et al. |
| 2007/0284557 A1* | 12/2007 | Gruner .............. B82Y 30/00 252/500 |
| 2008/0087431 A1 | 4/2008 | Willauer et al. |
| 2008/0127475 A1 | 6/2008 | Griffo |
| 2008/0149363 A1 | 6/2008 | Han et al. |
| 2008/0220282 A1 | 9/2008 | Jang et al. |
| 2008/0306225 A1 | 12/2008 | Prud'Homme et al. |
| 2009/0036605 A1 | 2/2009 | Ver Meer |
| 2009/0155578 A1 | 6/2009 | Zhamu et al. |
| 2009/0198009 A1 | 8/2009 | Matsuki et al. |
| 2009/0308520 A1 | 12/2009 | Shin et al. |
| 2010/0021708 A1 | 1/2010 | Kong et al. |
| 2010/0047154 A1 | 2/2010 | Lee et al. |
| 2010/0059726 A1 | 3/2010 | Jung et al. |
| 2010/0096595 A1 | 4/2010 | Prud'Homme et al. |
| 2010/0096597 A1* | 4/2010 | Prud'Homme ........ B82Y 30/00 252/511 |
| 2010/0130701 A1 | 5/2010 | Lahdensuo |
| 2010/0159366 A1 | 6/2010 | Shao-Horn et al. |
| 2010/0163844 A1 | 7/2010 | Ermolov |
| 2010/0178464 A1 | 7/2010 | Choi et al. |
| 2010/0179645 A1 | 7/2010 | Chen et al. |
| 2010/0314118 A1 | 12/2010 | Quintero et al. |
| 2011/0067872 A1 | 3/2011 | Agrawal |
| 2011/0200674 A1 | 8/2011 | MacKay |
| 2011/0232901 A1 | 9/2011 | Carrejo et al. |

FOREIGN PATENT DOCUMENTS

| | | | |
|---|---|---|---|
| KR | 10-2007-0053164 A | | 5/2007 |
| KR | 10-2009-0014186 A | | 2/2009 |
| KR | 10-2009-0086536 A | | 8/2009 |
| KR | 20090086536 | | 8/2009 |
| KR | 10-2011-0053012 | * | 5/2011 |
| WO | 03103854 A1 | | 12/2003 |
| WO | 2007098578 A1 | | 9/2007 |
| WO | 2008045778 A1 | | 4/2008 |
| WO | 2008048705 A2 | | 4/2008 |
| WO | 2008097343 A2 | | 8/2008 |
| WO | 2008130431 A2 | | 10/2008 |
| WO | 2010002770 A1 | | 1/2010 |
| WO | 2010147860 A1 | | 12/2010 |

OTHER PUBLICATIONS

Mitchell et al. "Dispersion of Functionalized Carbon Nanotubes in Polystyrene", Macromolecules 2002, 35, 8825-8830.

Thierry Cassagneau et al., "Preparation and Characterization of Ultrathin Films Layer-by-Layer Self-Assembled from Graphite Oxide Nanoplatelets and Polymers"; Langmuir 2000 16 (18), 7318-7324.

Aravind Dasari et al, "Fundamental aspects and recent progress on wear/scratch damage in polymer nanocomposites," Materials Science and Engineering R 63 (2009) 31-80.

Borondics, et al.; "Functionalization of Carbon Nanotubes Via Dissolving Metal Reductdions"; Journal of Nanoscience and Nanotechnology; 7; pp. 1551-1559; (2007).

Busick, et al., "Effects of graphite content on the morphology and barrier properties of poly(vinylidene fluoride) composites," Polymer 40: 6023-6029 (1999).

Chakraborty, et al.; "Reductive Alkylation of Fluorinated Graphite"; Chem. Mater.; 20; pp. 3134-3136; (2008).

Chattopadhyay, et al.; "Carbon Nanotube Salts. Arylation of Single-Wall Carbon Nanotubes"; Organic Letters; 7 (19); pp. 4067-4069; (2005).

Christopher A. Dyke et al., "Covalent Functionalization of Single-Walled Carbon Nanotubes for Materials Applications," The Journal of Physical Chemistry; vol. 108, No. 51, Dec. 23, 2004, pp. 11151-11159.

Deanna N. Busick, et. al.; Effects of graphite content on the morphology and barrier properties of poly(vinylidene fluoride) composites; Polymer 40; 1999; pp. 6023-6029.

Hannes C. Schniepp, et al.; Functionalized Single Graphene Sheets Derived from Splitting Graphite Oxide; The Journal of Physical Chemistry Letters, vol. 110; 2006; pp. 8535-8539.

Jinni Deng et al., "Mechanical and Surface Properties of Polyurethane/Fluorinated Multi-Walled Carbon Nanotubes Composites," Journal of Applied Polymer Science DOI 10.1002/app.27625, Published online Feb. 4, 2008 in Wiley InterScience (www.interscience.wiley.com), pp. 2023-2028.

Lee et al.; "Layer-by-Layer Assembly of All Carbon Nanotube Ultrathin Films for Electrochemical Applications"; J. Am. Chem. Soc., 131 (2); pp. 671-679; (2009).

Liang, et al.; "A Convenient Route to Functionalized Carbon Nanotubes"; Nano Letters; 4(7); pp. 1257-1260; (2004).

Nina I. Kovtyukhova, et. al.; Layer-by-Layer Assembly of Ultrathin Composite Films from Micron-Sized Graphite Oxide Sheets and Polycations; Chem. Mater, vol. 11, No. 3; 1999; pp. 771-778.

International Search Report and Written Opinion for International Application No. PCT/US2011/043033; Mailed Mar. 22, 2012; 11 pages.

International Search Report and Written Opinion for International Application No. PCT/US2011/050956; Mailed Apr. 30, 2012; 10 pages.

Sasha Stankovich, et. al. Graphene-based composite materials; Nature 04969, vol. 442; 2006; pp. 282-286.

Shen, et al.; "Layer-by-Layer Self-Assembly of Graphene Nanoplatelets"; Langmuir; 25(11), pp. 61-22-6128; (2009).

Stankovich, et al., "Graphene-based composite materials," Nature 442(20): 282-286 (2006).

Stephenson, et al.; "Highly Functionalized and Soluble Multiwalled Carbon Nanotubes by Reductive Alkylation and Arylation: The Billups Reaction"; Chem. Mater.; 18; pp. 4658-4661; (2006).

William S. Hummers Jr., et. al.; Preparation of Graphitic Oxide; J. Am. Chem. Soc.; 1957; p. 1339.

Woo-Sik Jang, et. al.; Layer-by-layer assembly of thin film oxygen barrier; Thin Solid Films, vol. 516; 2008; pp. 4819-4825.

Extended European Search Report for related EP Application No. 11745232.6-1303 / 2536561, dated Feb. 6, 2014, pp. 1-8.

International Search Report and Written Opinion; International Application No. PCT/US2012/024094; International Filing Date: Feb. 7, 2012; Date of Mailing: Sep. 3, 2012; 7 pages.

International Search Report and Written Opinion; International Application No. PCT/US2012/069098; International Filing Date: Dec. 12, 2012; Date of Mailing: Mar. 15, 2013; 12 pages.

Office Action for related Gulf Co-Operation Application No. GC 2011-17807, dated Sep. 21, 2014, pp. 1-18.

Pekker, et al. Hydrogenation of Carbon Nanotubes and Graphite in Liquid Ammonia, J. Phys. Chem. B. 2001; 105: 7938-7943.

Scientific Background on the Nobel Prize in Physics 2010—Graphene—compiled by the Class for Physics of the Royal Swedish Academy of Sciences, The Royal Swedish Academy of Sciences, pp. 1-10 (Oct. 5, 2010).

Singh, et al. Organic functionalization and characterization of single-walled carbon nanotubes, Chemical Society Reviews 2009; 38: 2214-2230.

Sirotinkin, et al., "Model of Formation of Three-Dimensional Polyurethane Films Modified by Detonation Nanodiamonds," Physics of the Solid State, vol. 46, 2004, pp. 746-747. Translated from Fizika Tverdogo Tela, vol. 46, 2004, pp. 725-726.

Chattopadhyay, et al, Carbon Nanotubes Salts. Arylation of Single-Wall Carbon Nanotubes, Rice Univ., Apr. 2005, p. 4067-4069.

Dyke, et al., Covalent FUnctinaliztion of Single-Walled CArbon Nanotubes for Materilas Application, American Chemical Society, Sep. 2004, p. 11151-11159.

Viory et al., "Dissolution and alkylation of industrially produced multiwalled carbon nanotubes", Carbon, 49, 1, pp. 170-175, Jan. 1, 2011.

\* cited by examiner

A: graphene oxide coated sample
B: uncoated sample

FIG. 10

A1: exfoliated graphene oxide coated sample (80 layers)
A2: exfoliated graphene oxide coated sample (20 layers)
B1: graphene oxide coated sample (80 layers)
B2: graphene oxide coated sample (20 layers)
B3: graphene oxide coated sample (10 layers)
B4: uncoated sample

US 9,433,975 B2

METHOD OF MAKING A POLYMER/FUNCTIONALIZED NANOGRAPHENE COMPOSITE COATING

CROSS REFERENCE TO RELATED APPLICATION

This application is a divisional of U.S. Non-provisional application Ser. No. 12/707,015 filed on Feb. 17, 2010, now U.S. Pat. No. 9,193,879 B2. The parent application is incorporated herein by reference in its entirety.

BACKGROUND OF THE INVENTION

A down-hole environment such as, for example, an oil or gas well in an oilfield, may expose equipment used down-hole, such as packers, blow out preventers, drilling motor, drilling bit, and the like, to conditions which may affect the integrity or performance of the element and tools.

Where the article is an element having a rubber or plastic part or coating, down-hole conditions may cause, for example, swelling by uptake of hydrocarbon oil, water or brine, or other materials found in such environments, and which can thereby weaken the structural integrity of the element or cause the element to have poor dimensional stability, resulting in difficulty in placing, activating, or removing the element. Likewise, where the element includes metallic components, these components may be exposed to harsh, corrosive conditions due to the presence of materials such as hydrogen sulfide and brine, which may be found in some down-hole environments.

Protective coatings are therefore desirable on such down-hole elements, particularly coatings having improved barrier properties to resist exposure to a variety of different environmental conditions and materials found in down-hole environments.

SUMMARY

The above and other deficiencies of the prior art are overcome by, in an embodiment, a composite including a substrate, a binder layer disposed on a surface of the substrate; and a nanofiller layer comprising nanographene and disposed on a surface of the binder layer opposite the substrate.

In another embodiment, a nano-coating for an article includes multiple alternating layers of a layer comprising nanographene particles having an aspect ratio greater than or equal to 10, and a binder layer comprising a binder, wherein the nano-coating is disposed on a surface of an article.

In another embodiment, a method of forming a protective nano-coating on an article includes depositing multiple alternating layers of a first layer on a surface of a substrate, the first layer comprising a polymeric composition; and a second layer comprising nanographene particles on a surface of the first layer opposite the substrate. Successive occurrences of the first layer are deposited on successive occurrences of a second layer to form the multilayer nano-coating layer.

We turn now to the figures, which are meant to be exemplary of the embodiments and not limited thereto.

The above described and other features are exemplified by the following detailed description.

DETAILED DESCRIPTION OF THE INVENTION

Disclosed herein is a novel nano-coating formulation which includes nanoparticulate nanofillers and polymers. It has surprisingly been found that a nanofiller coating, also referred to herein as a "nano-coating", as disclosed herein, has improved barrier properties and provides an effective inhibition or retardation of diffusion of liquids, solutes, and/or gases into a substrate underlying the nanofiller coating. In this way, improved resistance of substrates to environmental effects such as, for example, swelling of an underlying polymeric substrate by diffusion of oil into the substrate, corrosion of an underlying metallic substrate by diffusion of a corrosive gas or liquid to the surface of the metal, etc., may be accomplished. In embodiments, the nano-coating may be a single layer of nanofiller dispersed in a polymeric matrix, or may, in a specific embodiment, be a layer of nanofiller, alone or dispersed in a matrix, and disposed on a binder layer. In further embodiments, multiple layers of the nanofiller and/or the binder layers may be included.

The nano-coating comprises a nanofiller possessing high aspect ratio and high surface area. Nanofillers may include, for example, nano-scale particles of materials such as nanographite, graphenes including derivatized or non-derivatized nanographene, fullerenes such as $C_{60}$, $C_{70}$, $C_{76}$, and the like, nanotubes including single and multi-wall carbon nanotubes, doped nanotubes, or metallic nanotubes, including functionalized derivatives of these; nanodiamonds; untreated or surface treated polyorganosilsesquioxane (POSS) derivatives having defined closed or open cage structures, and the like. The nanofillers may be non-derivatized, or may be derivatized to include chemical functional groups to increase dispersibility, reactivity, surface properties, compatibility, and other desirable properties. Combinations comprising at least one of the following may be used.

In an embodiment, the nanofiller may be coated with a metal coating such as Ni, Pd, Fe, Pt, and the like, or an alloy comprising at least one of the foregoing.

The nanofillers can also be blended in with other, more common filler particles such as carbon black, mica, clays such as e.g., montmorillonite clays, silicates, and the like, and combinations thereof.

In an embodiment, the nanofiller includes a nanographene. Nanographene, as disclosed herein, is effectively a two-dimensional particle of nominal thickness, having a stacked structure of one or more layers of fused hexagonal rings with an extended delocalized π-electron system, layered and weakly bonded to one another through π-π stacking interaction. Graphene in general, and including nanographene, may be a single sheet of graphite having nano-scale dimensions, such as in some embodiments having a largest average dimension of less than e.g., 500 nanometers (nm), and more particularly a largest average dimension less than 200 nm, or in other embodiments may be greater than 1 micrometer (μm). Generally, the average diameter of a nanofiller including nanographene is 1 to 5 micrometers, specifically 2 to 4 micrometers. As used herein, "average largest dimension" and "average diameter" may be used interchangeably, and refer to particle size measurements based on number average particle size measurements.

Nanographene can be of various dimensions, predominantly having a two-dimensional aspect ratio (i.e., ratios of length to width, at an assumed thickness; diameter to thickness; or surface area to cross-sectional area, for plate-like nanofiller such as nanographene or nanoclay) of greater than or equal to 10, specifically greater than or equal to 100, more specifically greater than or equal to 200, and still more specifically greater than or equal to 500. Similarly, the two-dimensional aspect ratio is less than or equal to 10,000, specifically less than or equal to 5,000, and still more specifically less than or equal to 1,000. Where the aspect ratio is greater for the plate-like nanofiller, the barrier properties have been found to improve, where it is believed that higher aspect ratio favors a higher degree of alignment and overlap of the plate-like nanofiller.

The nanographene is formed by exfoliation from a graphite source. In an embodiment, the nanographene is formed by exfoliation of graphite, intercalated graphite, and nanographite. Exemplary exfoliation methods include, but are not limited to, those practiced in the art such as fluorination, acid intercalation, acid intercalation followed by thermal shock treatment, and the like. Exfoliation of the nanographene provides a nanographene having fewer layers than non-exfoliated nanographene. It will be appreciated that exfoliation of nanographene may provide the nanographene as a single sheet only one molecule thick, or as a layered stack of relatively few sheets. In an embodiment, exfoliated nanographene has fewer than 50 single sheet layers, specifically fewer than 20 single sheet layers, specifically fewer than 10 single sheet layers, and more specifically fewer than 5 single sheet layers.

The nanofillers, including nanographene after exfoliation, can be derivatized to introduce chemical functionality on the surface and/or edges of the nanographene sheet, to increase dispersibility in and interaction with various matrices including polymer resin matrix. Nanographene may be derivatized to include functional groups such as, for example, carboxy (e.g., carboxylic acid groups), epoxy, amine, hydroxy, alkyl, benzyl, other monomer, polymer and the like, and combinations thereof. In an embodiment, the nanographene is derivatized to carry a net positive charge by, for example, amination to include the amine groups. In another embodiment, the nanographene can be derivatized by oxidative methods to produce carboxylic acid functional groups which carry a negative charge. In another embodiment, the nanographene can be further derivatized by grafting certain polymer chains which can carry either a negative or positive charge by adjusting the pH value of its aqueous solution. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included.

The nanographene may alternatively be applied as a solution or dispersion in a liquid medium such as oil, water, or an oil-water blend or emulsion, to form the nano-coating. In an embodiment, the nanographene suspended in water is derivatized by oxidation to include carboxylic acid groups. While not wishing to be bound by theory, it is believed that the functionality of the nanographene, e.g., carboxylic acid groups, interact with complementary groups on an oppositely charged substrate (such as an amine substrate) to form an adduct. In an exemplary embodiment, where nanographene is derivatized with carboxylic acid groups (or polymeric or oligomeric groups having carboxylic acid groups) and is therefore negatively charged at a pH of greater than 7; and the substrate (or a binder layer disposed on the substrate) on which the derivatized nanographene is disposed has amine functional groups and is therefore positively charged at a pH of less than 7, the nanographene can arrange itself to distribute its net charge over as great a surface area of the substrate as possible, locally forming ammonium groups and carboxylate groups and/or forming hydrogen bonded adducts between amine groups and the hydrogen of the carboxylic acid, on the surfaces of the substrate/binder and the derivatized nanographene, respectively. In an alternative embodiment, the nanographene may be derivatized with amine groups (or polymeric or oligomeric groups having amine groups) and is therefore positively charged at a pH of less than 7; and the substrate (or a binder layer disposed on the substrate) on which the derivatized nanographene is disposed has carboxylic acid functional groups and is therefore negatively charged at a pH of greater than 7. The derivatized nanographene, in each of these embodiments, may orient to the surface of the substrate/binder to be coplanar (i.e., parallel) with it.

In another embodiment, where the nanographene is not derivatized, the nanographene may be formulated in a binder and casting solvent, or mechanically dispersed in a polymer resin matrix, and may orient to be coplanar with the surface of the substrate/binder through dispersion or mechanical forces. Blending and dispersion of the nanofiller and the polymer resin may be accomplished by methods such as, for example, extrusion, high shear mixing, three roll milling, and the like. Alternatively in another embodiment, where the nanographene is not derivatized to include covalent chemical functional groups, the nanographene may be oriented on the surface by, for example, adjusting substrate composition or by a surface treatment to adjust surface polarity of the substrate, by adjusting polarity and properties such as boiling point of the casting solvent, by including a binder with the nanographene and adjusting the properties of the binder, or by modifying the nanographene with non-covalent functional groups such as ionic or non-ionic surfactants. Such adjustments can be used to cause the plate-like nanographene to arrange or assemble on a substrate surface in a layer by taking advantage of the intrinsic surface properties of the nanographene after exfoliation, rather than by chemically modifying the nanographene to form the nano-coating. Thus in an embodiment, advantage may be taken of the surface charge intrinsic to the substrate, binder, and nanofiller layers in order to achieve arrangements of the nanofiller to be coplanar with the surface of the substrate/binder.

The nano-coating may include a nanofiller alone, or a mixture of nanofiller with a binder and/or other additive(s). In an embodiment, nanofiller is blended and dispersed mechanically in a polymer resin then applied to form the nano-coating, or is suspended or dissolved to form a solution (i.e., a coating formulation) of nanofiller and polymer resin and/or additive. In an embodiment, the nanofiller is suspended in water and coated by dip coating. In a specific embodiment, the nanofiller suspended or dispersed in water is a derivatized nanographene. The nano-coating of the nanofiller, after washing, drying and any post-processing such as curing, cross-linking, or the like, may include the nanographene as either all or a predominant portion of the total solids, or as a minority portion.

In the nano-coating, nanofiller may be present in an amount of 0.1 to 20 wt %, specifically 0.5 to 15 wt %, more specifically 1 to 10 wt %, and still more specifically 2 to 7 wt %, based on the total weight of the nano-coating.

The nano-coating is formed by applying the coating formulation or polymeric dispersion of the nanofiller and polymer resin to the substrate to be coated. Coating formulations may include a dispersion of the nanofiller including nanographene in e.g., water or oil, or as a dispersion/solution of nanographene in a solvent (water or an organic solvent) along with a polymer resin or binder, where the total solids of nanofiller, polymer resin or binder, and the like, may be from 0.1 to 16 wt %, specifically 0.2 to 15 wt %, more specifically 0.5 to 12 wt %, and still more specifically 1.0 to 10 wt %, based on the total weight of the formulation.

In an embodiment, the nanofiller and a binder are combined and dispersed in a solvent for a nanofiller coating formulation. Exemplary solvents include, for example, water including buffered or pH adjusted water; alcohols, such as methanol, ethanol, propanol, isopropanol, butanol, t-butanol, octanol, cyclohexanol, ethylene glycol, ethylene glycol methyl ether, ethylene glycol ethyl ether, ethylene glycol butyl ether, propylene glycol, propylene glycol methyl ether, propylene glycol ethyl ether, cyclohexanol, and the like; polar aprotic solvents such as dimethylsulfoxide, N,N-dimethylformamide, N-methylpyrrolidone, gamma butyrolactone, and the like; and combinations of these. The nano-coating formulation may also include additional components such as common fillers and/or other nanofillers, and/or other additives. In another embodiment, the nanofiller is suspended in a solvent, where no polymer resin is included. In an embodiment (where the nanofiller is negatively charged), the solvent is water having a pH of greater than 7, specifically greater than or equal to 8, more specifically greater than or equal to 9, and still more specifically greater than or equal to 10. In another embodiment (where the nanofiller is positively charged), the solvent is water having a pH of less than 7, specifically less than or equal to 6, more specifically less than or equal to 5, and still more specifically less than or equal to 4. The pH may be adjusted by inclusion of an acid or base such as, respectively, hydrochloric acid or an alkali metal hydroxide such as sodium or potassium hydroxide, ammonium hydroxide or alkylammonium hydroxides such as tetramethylammonium hydroxide, trimethylbenzylammonium hydroxide, or the like.

The nano-coating of the nanofiller may be coated on a substrate surface by any suitable method such as, but not limited to, extrusion or coextrusion (where the nanofiller is blended with a polymer), lamination, dip coating, spray coating, roll coating, spin casting, and the like. The coating is then dried at ambient temperatures, or in an oven operating at elevated temperatures of greater than room temperature, specifically greater than or equal to 80° C., more specifically greater than or equal to 90° C., and still more specifically greater than or equal to 100° C. The nano-coating is further cured to strengthen and provide a protective, solvent and abrasion resistant matrix, where curing may be a thermal cure; irradiation using ionizing or non-ionizing radiation including visible or ultraviolet light, e-beam, x-ray, or the like; chemical curing as by e.g., exposure to an active curing agent such as an acid or base; or the like.

Multiple coatings of the same or a different composition can be deposited using successive, sequential depositions of layers in the nano-coating. In one embodiment, the nano-coating may be a single coating including the derivatized nanographene. The nano-coating is multilayered and comprises multiple, successively applied (i.e., alternating) layers of nanofiller and binder. In a specific embodiment, the nano-coating comprises multiple alternating layers of a layer comprising a polymeric composition as a binder and a nanofiller layer comprising nanographene on a surface of the first layer opposite the substrate.

In an embodiment, the nano-coating is a bilayer of a binder layer disposed on a surface of the substrate, with a nanofiller layer disposed on the binder layer. It will be appreciated that one layer of nanofiller may be formed where one iteration of a coating process, e.g., one dip coat in binder then one dip coat in nanographene, followed by washing, drying and/or curing, is carried out. In another embodiment, the nano-coating may include a quadruple layer structure, also referred to herein as a "quad" layer, in which a first binder layer having a positive or negative charge, is disposed on a surface of a substrate, followed by a second binder layer having a positive or negative charge opposite that of the first binder layer; a third binder layer disposed on the second binder layer and having a charge (positive or negative) opposite that of the second binder layer; and a nanofiller layer having a charge (positive or negative) opposite that of the third binder layer. In another embodiment, the first, second, and third binder layers, and the nanofiller layer, do not carry a formal charge but the surface chemistry of each adjacent layer may be altered by inclusion of differing amounts of nanofiller. In a specific embodiment, alternating layers contain different amounts of nanofiller, where the relative difference in nanofiller content between layers is at least 3 fold, specifically at least 5 fold, and more specifically at least 10-fold based on the weight of nanofiller. In an embodiment, the adjacent layers each contain nanofiller. In another embodiment, one adjacent layer contains no nanofiller, and the adjacent layer contains nanofiller. In another embodiment, the nanofiller in each adjacent layer is nanographene. In another embodiment, the nanofillers are different, where at least one layer contains nanographene. It will be appreciated that in this way, a nanofiller gradient may be formed, in which adjacent layers containing nanofiller (e.g., nanographene) are, after processing, indistinguishable as discrete layers, either as a result of controlling concentration of nanofiller in adjacent layers, or by diffusion of nanofiller between adjacent layers.

In further embodiments, more than one layer of the nanofiller layer, or of the bilayer or quad layers, is deposited successively on the surface of the substrate. In a specific embodiment, the multilayered coating comprises greater than or equal to 20 nanofiller layers, specifically greater than or equal to 40 nanofiller layers, more specifically greater than or equal to 60 nanofiller layers, and still more specifically greater than or equal to 80 nanofiller layers. In still another embodiment, a layer in the multilayered coating includes a binder layer applied prior to coating of the nanofiller layer, where the charge of the binder layer is opposite that of the binder layer. In another embodiment, a nano-coating comprises a substrate having a first (charged) binder layer disposed thereon, a nanofiller layer comprising derivatized or non-derivatized nanographene and disposed on the first binder layer, and having a charge opposite that of the first binder layer; a second binder layer disposed on the nanofiller layer and having a charge opposite that of the first nanofiller layer; and a second nanofiller layer disposed on a surface of the second binder layer, where the second nanofiller layer comprises a different nanofiller such as a derivatized or non-derivatized carbon nanotube and/or a combination of nanofillers.

In an embodiment, the binder, also referred to as a "binder material," is neutral in charge, or has a net positive or negative charge, and the nano-filler is also neutral or has a net positive or negative charge providing that where the nanofiller is charged, the charge of the nano-filler is opposite that of the adjacent layer of binder material, e.g., the binder on which it is disposed or which is disposed on it. The binder material may be an ionic molecule, an oligomer or polymer, or a combination comprising at least one of the foregoing. In an embodiment, the positively charged binder material carries a positive charge at a pH of less than 7, specifically less than or equal to 6, more specifically less than or equal to 5, and still more specifically less than or equal to 4. Also in an embodiment, the negatively charged binder material carries a negative charge at a pH of greater than 7, specifically greater than or equal to 8, more specifically greater than or equal to 9, and still more specifically greater than or equal to 10.

Negatively charged binder materials may include polycarboxylic acids such as poly(meth)acrylic acid, salts thereof, or the like; a polycarboxylic acid copolymer such as a poly((meth)acrylic acid-co-methyl (meth)acrylate) copolymer, poly(styrene-co-(meth)acrylic acid), poly(styrene-co-maleic acid), and the like, and combinations comprising at least one of the foregoing polymers. As used herein, "(meth)acrylic" means "acrylic" or "methacrylic", and "(meth)acrylate" means "acrylate" or "methacrylate", unless otherwise specified. Also as used herein, "copolymer" refers to a polymer formed by the reaction of two or more different monomers, and therefore encompasses as well the more specific terms "terpolymer", "tetrapolymer" and the like. In an exemplary embodiment, the negatively charged binder material is polyacrylic acid, which is water soluble.

In another embodiment, the positively charged binder material may be an amine-containing polymer. For example, a polyamine such as those prepared by the polymerization of aziridene and including polyethyleneamines and polyethyleneimines having a branched structure derived from aziridene and tris(aminoethyl)amine; a hyperbranched or dendrimeric polyamine such as polyamidoamine (PAMAM) dendrimer; a polyaminoacrylate such as poly(N,N-dimethylaminoethyl-(meth)acrylate); a copolymer thereof with an alkyl or aralkyl (meth)acrylate such as methyl (meth)acrylate, ethyl (meth)acrylate, butyl (meth)acrylate, cyclohexyl (meth)acrylate, 2-hydroxyethy (meth)acrylate, 2-hydroxypropyl (meth)acrylate, (meth)acrylonitrile, and the like, such as, for example, poly(N,N-dimethylaminoethyl-(meth)acrylate)-co-(methyl(meth)acrylate); combinations comprising at least one of the above polymers, and the like, may be used. In an exemplary embodiment, the positively charged binder material is polyethyleneimine, which is water soluble.

The nano-coating may have a thickness less than or equal to 500 micrometer (μm). In an embodiment, the nano-coating has a thickness of 0.01 to 500 micrometers, specifically 0.05 to 200 micrometers, more specifically 0.1 to 100 micrometers, and still more specifically 0.1 to 50 micrometers. In a more specific embodiment, where binder layers are included, the nanofiller layer has the above thicknesses, and the binder layer(s) may have a thickness of 1 to 100 nm, specifically 2 to 50 nm, more specifically 3 to 10 nm. In an exemplary embodiment, a binder layer has a thickness of 4 to 5 nanometers. Where the nano-coating exceeds about 500 micrometers, the flexibility of the nano-coating and adhesion to the underlying substrate may be affected, and may lead to crack propagation and ultimately adhesion failure, which would compromise the barrier properties of the nano-coating. Similarly, where the nano-coating is less than 0.1 μm in thickness, the barrier properties may be insufficient. For reasons such as these, it is desirable to keep the nano-coating as thin as possible while maintaining effectiveness as a barrier to diffusion and permeation.

The nano-coating, including in embodiments the bilayer, quadruple layer, or multilayer structures, may be crosslinked to improve mechanical performance. In an embodiment, the nano-coating is a layered polymeric coating that is cross-linked through the binder. In an embodiment, the nanographene is non-derivatized and is dispersed in the binder; and in another embodiment, the binder material forms interparticle bonds with the derivatized nanographene. Where the binder and derivatized nanographene of the nano-coating are of opposing charge, such as where the binder is a polyamine and the nanographene has carboxylic acid functional groups, the binder and derivatized nanographene form, for example, ionic bonds by protonation of the amine functionality by the carboxylic acid groups.

Alternatively, or in addition, a crosslinker may be included in the nano-coating. Useful crosslinkers may include, for example, acid catalyzed crosslinkers such as those having methoxymethylene groups and including glycolurils, melamines, amides, and ureas; epoxy crosslinkers which may react with amines and carboxylic acids such as bisphenol A diglycidyl ether, epoxy-substituted novolac resins, poly(glycidyl (meth)acrylate) polymers and copolymers, poly(2,3-epoxycyclohexylethyl)(meth)acrylate-containing polymers and copolymers, and the like; and radically initiated crosslinkers such as ethylene di(meth)acrylate, butylenedi(meth)acrylate, trimethylolpropane tri(meth)acrylate, dipentaerythritol penta(meth)acrylate; bismaleimides; and the like, and combinations thereof, may be used. Suitable initiators may be included as necessary, where useful initiators may be selected by the skilled artisan.

The nano-coating is disposed on a substrate. Exemplary substrates include those comprising polymers and resins such as phenolic resins including those prepared from phenol, resorcinol, o-, m- and p-xylenol, o-, m-, or p-cresol, and the like, and aldehydes such as formaldehyde, acetaldehyde, propionaldehyde, butyraldehyde, hexanal, octanal, dodecanal, benzaldehyde, salicylaldehyde, where exemplary phenolic resins include phenol-formaldehyde resins; epoxy resins such as those prepared from bisphenol A diepoxide, polyether ether ketones (PEEK), bismaleimides (BMI), nylons such as nylon-6 and nylon 6,6, polycarbonates such as bisphenol A polycarbonate, polyurethanes, nitrile-butyl rubber (NBR), hydrogenated nitrile-butyl rubber (HNBR), high fluorine content fluoroelastomers rubbers such as those in the FKM family and marketed under the tradename VITON® (available from FKM-Industries) and perfluoroelastomers such as FFKM (also available from FKM-Industries) and also marketed under the tradename KAL-REZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyethylene, polyvinylalcohol (PVA), and the like. In addition, the substrate may be a metallic or metal-clad substrate, where the metal is iron, steel, chrome alloys, hastelloy, titanium, molybdenum, and the like, or a combination comprising at least one of the aforementioned.

The substrate may be left untreated, or may be surface treated prior to deposition of the coating containing the nanofiller, or prior to deposition of a binder layer or primer layer, followed by the nanofiller coating. Surface treating of the substrate may be effected by a known method such as, for example, corona treatment, plasma treatment, chemical vapor treatment, wet etch, ashing, primer treatment including polymer based primer treatment or organosilane treatment, or the like. In an exemplary embodiment, the surface of the substrate is treated by corona treatment prior to deposition of the nano-coating. In another embodiment, the surface of the substrate is pretreated by first applying a polymer-based primer layer prior to deposition of the nano-coating. An exemplary primer includes those manufactured by Lord Adhesives and marketed under the tradename CHEMLOK®. In another embodiment, the surface of the substrate may be pretreated by dipping the substrate in an organosilane primer to form the primer layer prior to deposition of the nano-coating. Such pretreatments serve to enhance the adhesion and bonding between the nano-coating and the substrate.

Surprisingly, the nano-coating has a unique combination of relatively low nanofiller concentration, small nanofiller size (i.e., an average diameter of less than 5,000 nm) and specific physical properties such as impermeability, environmental stability, and thermal and electronic properties. In many respects, nanographene resembles polymer chains used as composite matrices, where both have covalently bonded structures, similar dimensions and mechanical flexibility. Nanographene has unique barrier properties and can conduct heat and electricity down the long axis of the nanographene with an efficiency approaching that of metals such as copper and aluminum. Combinations of nanographene in binder polymers and elastomers would have unique structure property relationship and can act as an effective fluid barrier for an oil field element while allowing function of the element at a much higher temperature. It has been found that when applied to a surface such as a polymeric surface, the coating imparts unique barrier properties which impedes diffusion and permeation of liquids such as hydrocarbon oil, water including both fresh water and brine, gases such as low molecular weight hydrocarbons (e.g., methane, ethane, propane, butanes, and the like), hydrogen sulfide, water vapor, and combinations of these liquids and/or gases.

The high (>10) aspect ratio nanographene exhibits a unique physical arrangement in the nano-coating by forming an interlocked barrier formed of overlapping, surface-aligned plate-like filler particles, which provide a tortuous diffusion pathway for any permeating compounds, and further provides a chemical impediment for diffusing molecules that is conceivably not possible to achieve with other traditional fillers such as clay, mica, carbon black, silicate, and the like due to either the lack of an overlapping plate-like morphology as in carbon black, or due to the more hydrophilic composition and structures of inorganic materials. In specific instances, the performance of a nano-coating containing the nanographene can be further enhanced by, for example, coating the nanographene with a metal or metal oxide coating. For example, where a metal coating is applied to a nanographene used in the nano-coating, the diffusion of solute salts such as sodium chloride in water (brine) is restricted, where the salts do not crystallize at the interface of the nano-coating and the substrate, but are trapped on the high surface area on the metal coated nanographene particles. In this way, the nanofiller (i.e., including nanographene) particles can be further adjusted or enhanced to provide additional desirable properties including barrier properties for ionic solutes, and may also enhance other properties such as electrical conductivity.

These nano-coatings can be deposited by various processes, such as lamination, layer-by-layer coating by successive applications of liquid coating formulations, and the like. Each individual layer (including binder and nanofiller layers) can have thickness ranging from 1 nm to 10 μm, depending on the layer. Multiple coatings of same or different composition can be deposited.

Thus in an embodiment, a method of forming the nano-coating includes disposing a nano-coating layer comprising nanographene on a substrate. The substrate may further be surface treated, for example, by corona treatment, or by deposition of an adhesion layer, to enhance adhesion and/or dispersion of the nanofiller on the surface of the substrate. The nano-coating may include the derivatized or non-derivatized nanographene alone, cured to crosslink by direct bond forming between nanofiller particles, or by crosslinking through monomeric or polymeric crosslinkers and/or binders. The binder and nanofillers layers may be post-treated with crosslinking and/or with a high temperature postcure, to further crosslink and cure the nano-coating. In another embodiment, a method of forming the nano-coating includes depositing a binder layer on a surface of a substrate, where the binder layer is a polymeric composition, followed by a nanofiller layer disposed on a surface of the binder layer opposite the substrate, where the nanofiller layer is not identical to the binder layer, and where the nanofiller layer includes derivatized or non-derivatized nanographene. In an embodiment, the method comprises depositing multiple alternating layers of binder layer and nanofiller layer, in which successive occurrences of binder layer are deposited on successive occurrences of nanofiller layer to form an alternating layered stack. In this embodiment, only the first occurrence of the binder layer is deposited directly on the substrate.

In a specific embodiment, a method of forming the nano-coating includes depositing a binder layer on a surface of a substrate, where the binder layer is a polymeric composition having a positive or negative charge, followed by a second layer disposed on a surface of the first layer opposite the substrate, the second layer having a positive or negative charge not identical to the charge of the first layer, and which includes derivatized nanographene particles.

In a further embodiment of the method, the substrate is surface treated before deposition of the binder layer. In a further embodiment, more than one binder layer may be applied, in odd numbers (1, 3, 5, etc.) of layers, where each layer has a charge opposite its adjacent layer. Also in the method, an additional binder layer(s) may be disposed on a surface of the nanofiller layer, and a multilayered structure having alternating bilayer structure of binder, nanofiller, binder, nanofiller, etc. layers, or alternating quad layers of first binder, second binder, third binder, nanofiller, first binder, etc., layers, or combinations of quad and bilayer structures, may be applied. In addition, a further filler layer, including substantially a different filler such as, for example, a carbon nanotube, nanoclay, or the like, may be included in one or more layers of the multilayered structure.

In an embodiment, the nano-coatings can be applied in part or completely to articles including different oilfield or down-hole elements such as, for example, a packer element, a blow out preventer element, a torsional spring of a sub surface safety valve, a submersible pump motor protector bag, a blow out preventer element, a sensor protector, a sucker rod, an O-ring, a T-ring, a gasket, a pump shaft seal, a tube seal, a valve seal, a seal for an electrical component, an insulator for an electrical component, a seal for a drilling motor, or a seal for a drilling bit. The article is wholly or partially coated with the nano-coating. When coated with the nano-coating, these articles and elements have improved resistance to permeation relative to uncoated elements, or to elements coated with polymer and/or standard filler-containing coatings that do not include nanographene in the nanofiller. The nano-coated articles can be used under challenging conditions such as those experienced in undersea or sub-terrain applications.

An example of an application in a sub-terrain environment is where an element used in a down-hole application is exposed to severe conditions due to the presence of corrosive gases such as hydrogen sulfide, and other gases and chemicals. Where the element, such as a packer element, has a coating as disclosed herein, the coated element can demonstrate permeation selectivity, i.e., can preferentially impede water diffusion over diffusion of oil (hydrocarbon) components. The nano-coating can, in this way, also aid filtration and may be useful in a membrane or filter separation application. The permeation, barrier or diffusion properties can be selected for by choice of the type and properties of nanofiller, its blend components, and the deposition techniques. Another advantage of an article or element having a coating based on nano-filler is its efficacy in high temperature (e.g., greater than 100° C.) and/or high pressure (greater than 1 bar) environments, due to the robustness of the nanofillers based on nanographene, under these conditions.

The nano-coatings are further described with reference to the following exemplary embodiments shown in the figures.

Figure 1:
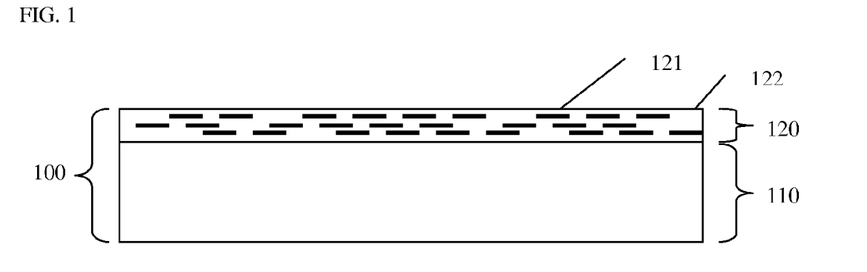
FIG. 1 is a sectional view of an exemplary embodiment of a nano-coating on a surface of a substrate.

In an exemplary embodiment, FIG. 1 shows a composite 100 including a substrate 110 with a nano-coating 120 disposed on a surface of the substrate 110. As used herein, "substrate" may be a simple article, an article having a complex three-dimensional structure, or may be a layer, sheet, film, or other two-dimensional surface. In one embodiment, nano-coating 120 is a composite of a plate-like nanofiller 121, e.g., nanographene as disclosed herein, dispersed in a polymeric matrix 122. The nanographene may be directly formed on the surface of the substrate 110 without a polymeric matrix (not shown), where the substrate 110 may be textured or treated to provide a suitable surface for binding or adsorption of the plate-like nanofiller 121. In an embodiment, the surface of substrate 110 is untreated or is treated by corona treatment prior to deposition of nano-coating 120.

Figure 2:
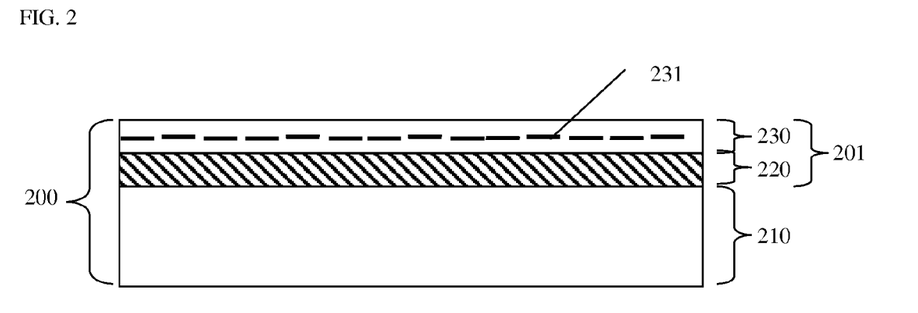
FIG. 2 is a sectional view of an exemplary embodiment of a substrate with a bilayer nano-coating of a binder layer and a nanofiller layer.

In another exemplary embodiment, FIG. 2 shows a composite 200 including a substrate 210 having a bilayer nano-coating 201 disposed on the surface of the substrate 210. The bilayer nano-coating 201 includes a binder layer 220 disposed on a surface of the substrate 210, and nanofiller layer 230 disposed on a surface of the binder layer 220 opposite substrate 210. In an embodiment, the surface of substrate 210 is treated by corona treatment prior to deposition of binder 220. In an embodiment, nano-coating 230 is a composite of a plate-like nanofiller 231, e.g., nanographene as disclosed herein, where the nanofiller 231 forms a nanofiller layer 230 on the surface of the binder layer 220. Nanofiller layer 230 has a net charge opposite that of binder layer 220. In an embodiment, the binder layer 220 is a positively charged layer comprising, for example, a polyethyleneamine, and the nanofiller layer 230 has a net negative charge, where the nanofiller is for example a nanographene derivatized oxidatively to have carboxylic acid groups. In an exemplary embodiment, the nanographene used as nanofiller 231 is disposed directly on the binder layer 220 without dispersion in a polymeric matrix, though it will be appreciated that the nanofiller layer 230 may also comprise, in an alternative embodiment, nanofiller dispersed in a polymeric matrix (not shown).

Figure 3:
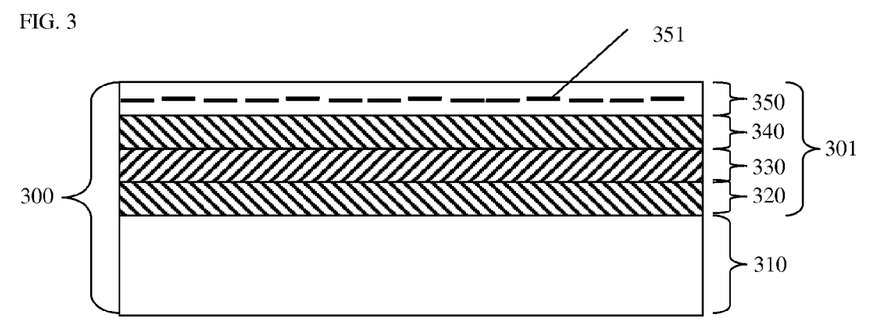
FIG. 3 is a sectional view of an exemplary embodiment of a substrate with a quadruple layer nano-coating of a first binder layer, second binder layer, third binder layer, and a nanofiller layer.

In another exemplary embodiment, FIG. 3 shows a composite 300 including a substrate 310 having a quad layer nano-coating 301 disposed on the surface of the substrate 310. The quad layer nano-coating 301 includes a first binder layer 320 having a positive charge disposed on a treated surface of the substrate 310, a second binder layer 330 having a negative charge disposed on a surface of the positively charged first binder layer 320, a third binder layer 340 having a positive charge and disposed on a surface of the negatively charged second binder layer 330, and a negatively charged nanofiller layer 350 disposed on a surface of the positively charged third binder layer 340. In an embodiment, the surface of substrate 210 is untreated, or is treated by corona treatment prior to deposition of binder layer 320. In an embodiment, nanofiller layer 350 is a composite of a plate-like nanofiller 351, e.g., nanographene as disclosed herein, where the nanofiller 351 forms a nanofiller layer 350 of consecutive plates of nanographene on the surface of the third binder layer 340 which can, in an exemplary embodiment, comprise polyethyleneimine.

In an embodiment, the nanofiller 351 in nanofiller layer 350 is a nanographene derivatized oxidatively to have carboxylic acid groups. Nanofiller layer 350 has a net charge opposite that of third binder layer 340; third binder layer 340 has a net charge opposite that of second binder layer 330, which can, in an embodiment, comprise for example polyacrylic acid, or a salt thereof; and second binder layer 330 has a net charge opposite that of first binder layer 320 and third binder layer 340, each of which can, in an exemplary embodiment, comprise polyethyleneimine. It will be appreciated that where substrate 310 is treated, the treated surface possesses a surface charge opposite that of the first binder layer 320. In a further embodiment, not shown, the nano-coating 301 comprises a repeating structure in which a second quad layer sequence of layers 320, 330, 340 and 350 are sequentially deposited on the nanofiller layer 350, followed by a third quad layer sequence of layers 320, 330, 340, and 350, etc., such that at least 20 sets of quad layers, and specifically, at least 80 sets of quad layers, are deposited. It will be appreciated that such a sequential deposition of quad layers provides an overlapping sequence of barrier layers having a "brick wall" like structure, in which the plate like nanofiller of layers 350 occlude any gaps between the nanofiller 351 when viewed along the vertical axis (orthogonal to the plane of the substrate 310). This overlap enhances the barrier properties of the nano-coating 301 by ensuring a nonlinear path through the nano-coating 301 for any diffusing species.

In an exemplary embodiment, the nanographene used as nanofiller 351 is disposed directly on the third binder layer 340 without dispersion in a polymeric matrix, though it will be appreciated that the nanofiller layer 350 may also comprise, in an alternative embodiment, nanofiller dispersed in a polymeric matrix (not shown).

Figure 4:
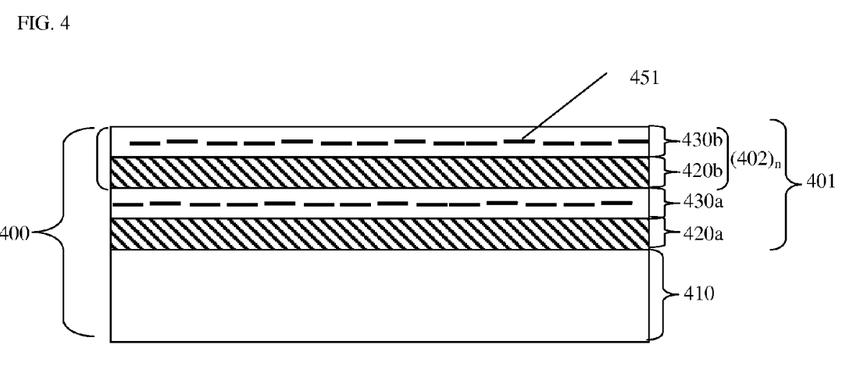
FIG. 4 is a sectional view of an exemplary embodiment of a substrate with multiple alternating binder and nanofiller layers.

In a further exemplary embodiment, FIG. 4 shows a composite 400 similar to that of FIG. 1, which includes a substrate 410 also having multilayer nano-coating 401 disposed on the surface of the substrate 410. The multilayer layer nano-coating 401 includes a first binder layer 420a disposed on a surface of the substrate 410, a nanofiller layer 430a disposed on a surface of the first binder layer 420a, a second binder layer 420b disposed on a surface of the first nanofiller layer 430a, and a second nanofiller layer 430b disposed on a surface of the second binder layer 420b. The composition of each layer, and the disposition of alternating layers (including, in an embodiment, alternating positive-negative-positive-negative charges or negative-positive-negative-positive charges of layers 420a, 430a, 420b, and 430b respectively), may be adjusted as required to form the stack shown, where each nanofiller layer 430a and 430b includes a nanofiller, e.g., derivatized or non-derivatized nanographene. In a further embodiment, binder layer 420a may be a single layer, or may be, for example, multiple layers such as for example a three layer stack of binder layers, optionally having alternating charges, similar to that binder layers 320, 330, and 340 shown in FIG. 3, above.

Though four layers are shown in FIG. 4, in a further embodiment, the binder layer 420b and nanofiller layer 430b, which comprise sublayer 402, may repeat in the vertical direction of the stacked layers (perpendicular to the plane of the substrate) as described for the quad layers of FIG. 3. Layer 402, shown in parentheses in FIG. 4, may be repeated such that n layers of sublayer 402 may be included in the nano-layer 401. Multiple nanofiller layers 430a and 430b are used to ensure that the desired barrier properties of nano-coating 401 are obtained, where the multiple layers of nanofiller layers 430b (and 430a) further build up and increase the plate overlap and accompanying barrier properties of the multilayer layer nano-coating 401. It is believed that the plate-like nanofiller 451, arrayed in the nanofiller layers (e.g. 430a, 430b) may be a "monolayer" of nanofiller (i.e., nanographene) and that including additional layers of the nanofiller, which may be coated over the previous layer in a layer-by-layer coating process, provides for a nano-coating having an increasingly dense layer of overlapping plate-like nanofiller (e.g., derivatized or non-derivatized nanographene) forming the nano-coating 401. In an embodiment, 20 or more coats of the nanofiller layer (where n is 19 for layer 402) may be applied in successive layers to the surface of the third binder layer 440 to form a net nanofiller layer. In an exemplary embodiment, 80 or more coats of the nanofiller layer (where n is 79 for layer 402) may be applied to form the net nanofiller layer. It has been found that increasing the number of these sub-coats of nanofiller layer further improves the barrier properties of the net nano-coating 401.

In an embodiment, the nanofiller layer 430b may comprise fullerenes, nanotubes, nanographene of a type other than that of the nanofiller layer 430a, a combination of these, or the like. In a specific embodiment, the nanofiller layer 430b includes carbon nanotubes which may be derivatized or non-derivatized as desired, to enhance the mechanical properties of the nano-coating. In an embodiment, each nanofiller layer 430b may be the same or different, and where one or more nanofiller layers is not identical, may include different nanofillers such as nanoclays, carbon nanotubes, and the like. It will be understood that where different nanofillers are used in more than one nanofiller layer 430b, at least some of the nanofiller layers 430a and/or 430b will contain nanographene sufficient to provide a nano-coating 401 having the desired barrier properties disclosed herein. In another embodiment, adjacent layers in the stack (e.g., 420a and 430a, etc.) may each contain nanofiller, where adjacent layers have at least a 3-fold difference in concentration of nanofiller such that the "nanofiller layers" (e.g., layers 430a, 430b in FIG. 4) contain at least three times as much nanofiller as the non-nanofiller layers such as binder layers 420a and 420b in FIG. 4.

Thus, nanofillers such as fullerenes, nanotubes, and the like, can be included in a nanofiller layer 430b as well as be included as a minor component in nanofiller 430a (other than nanographene 451); and likewise, can be included in one or more nanofiller layers 230 as well as binder layer 220 in FIG. 2, or in one or more nanofiller layers 350 as well as in binder layers 320, 330, and 340 of FIG. 3. Though these features are discussed in terms of the exemplary structure of FIG. 4, it will therefore be understood to extend to analogous layers and features in FIGS. 1 to 3, and in other embodiments not so illustrated, each of which may each be similarly modified to include multiple layers of nanofiller, where increasing the number of layers, and commensurately increasing the net thickness of the nano-coating and layers of nanofiller therein, and its overlapping plates of nanographene, provides a more tortuous diffusion pathway for small molecules such as hydrocarbons from oil, water, and gases.

In another embodiment (not shown), a substrate may be corona or primer treated and coated with a composite including a first binder layer having a charge opposite that of the treated substrate, a first nanofiller layer of an derivatized nanographene having a charge opposite the first binder, a second binder layer having a charge opposite the nanofiller layer, and a second nanofiller layer.

The above embodiments are further demonstrated in the following examples, which are intended as illustrative only and are not intended to be limited thereto.

Example 1

Formation of nanographene oxide by exfoliation and oxidation of nanographite. Derivatized nanographene oxide was prepared by use of known literature methods (see, e.g., (1) Hummers, W.; Offeman, R. *J. Am. Chem. Soc.* 1958, 80, 1339; (2) Schniepp, H. C.; Li, J.-L.; McAllister, M. J.; Sai, H.; Herrera-Alonso, M.; Adamson, D. H.; Prud'homme, R. K.; Car, R.; Saville, D. A.; Aksay, I. A. *J. Phys. Chem. B* 2006, 110, 8535; (3) Kovtyukhova, et al, *Chem. Mater.* 1999, 11, 771-778). Exfoliation of the nanographite was accomplished as follows. Concentrated sulfuric acid (50 ml) was heated to 90° C. in a 300 ml beaker. $K_2S_2O_8$ (10 g) and $P_2O_5$ (10 g) were added with stirring until the reactants dissolved completely. The mixture was then cooled to 80° C. followed by addition of graphite nanoplatelet (12 g, 5 μm particle size, available from XG Sciences). The mixture was kept at 80° C. for 4.5 hours on a hotplate. After reaction, 2 L of deionized (DI) water was added to the product, which was then washed by stirring, then collected by filtration and dried.

The pre-treated (exfoliated) graphite powder (i.e., nanographene) was then oxidized under strongly oxidizing conditions as follows. The exfoliated graphite powder (10 g) was added into cold 0° C. concentrated $H_2SO_4$ (250 ml) in a dried 500 ml 3-necked round bottom flask. $KMnO_4$ (30 g) was added gradually with stirring while the temperature was maintained at about 20° C. The mixture was then stirred at 35° C. for 2 hours. Distilled water (1 L) was then added to the flask, followed by an aqueous 30% (w/w) $H_2O_2$ solution (50 ml) to terminate the reaction. The reaction temperature was maintained below 50° C. and stirring was continued for 2 hours. The subsequent product was washed with 1 L of a solution of concentrated HCl diluted 1:10 with deionized (DI) water. The washed product was then collected by filtration, and further washed with DI water (repeated 3 times) until the pH of the filtrate was neutral, to yield nanographene oxide (surface derivatized to have carboxylic acid groups).

Figure 5:
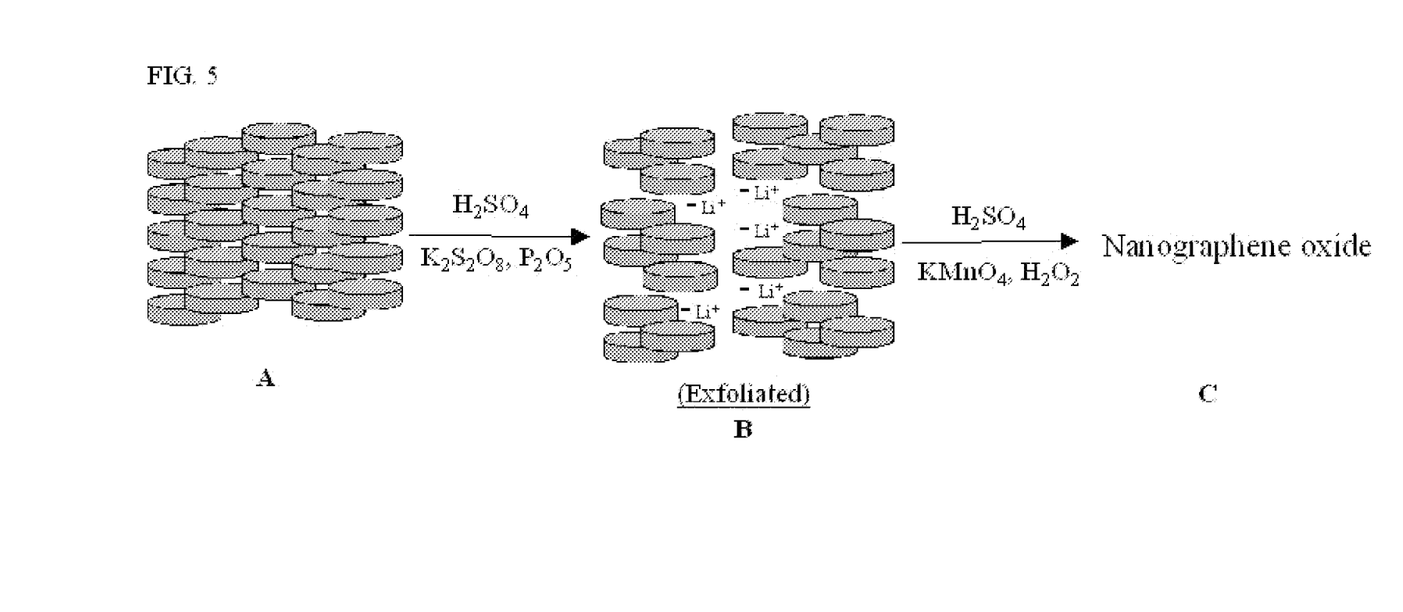
FIG. 5 is a schematic view of the exfoliation of nanographite (A) to form nanographene (B) followed by functionalization to form derivatized nanographene (C)

The reaction is further illustrated in FIG. 5, in which the nanographene (A) is depicted as having a plate-like structure (discs shown in profile) but which are tightly clustered. After exfoliation in the presence of $H_2SO_4$, $K_2S_2O_8$, and $P_2O_5$, the clusters of nanographite are shown to break up into smaller, more discrete plate-like units (B) of nanographene which provide a greater surface area and allow more intimate contact with further reaction conditions. The plate-like nanographene units (B) are further treated with $H_2SO_4$, $KMnO_4$, and $H_2O_2$, to oxidize a portion of the carbon-carbon bonds in the exfoliated nanographene to provide nanographene oxide (C) having carboxylic acid functional groups.

Figure 6:
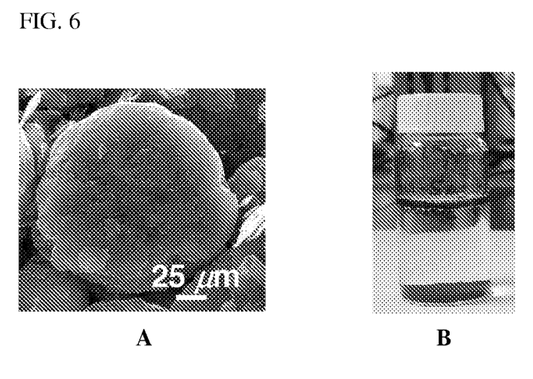
FIG. 6 shows a scanning electron micrograph (SEM) image of a particle of nanographite (A) and a photograph of nanographite in water (B)
Figure 7:
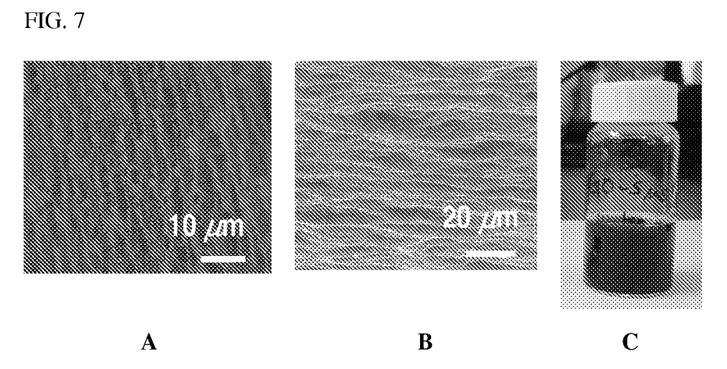
FIG. 7 is shows SEM images nanographene after exfoliation and functionalization (A) and (B), and a photograph of derivatized nanographene suspended in water (C)

The difference in dispersibility of nanographite as obtained, and the derivatized nanographene, is shown in FIGS. 6 and 7. FIG. 6A is a scanning electron microscope (SEM) image of a particle of nanographite, showing the clustering seen in non-exfoliated nanographite, where the material forms a rough sphere of greater than 150 μm in diameter. FIG. 6B is a photograph of nanographite in water, where it is clearly seen that the nanographite does not remain suspended in aqueous medium. FIGS. 7A and 7B are each SEM images taken of different films of exfoliated and derivatized nanographene, showing linear morphology for the plate-like nanographene particles evident in the images. FIG. 7C is a photograph of a suspension of nanographene after exfoliation and oxidation, where it can be seen that the nanographene remains suspended in aqueous medium (a 0.01 wt % aqueous suspension) for greater than 3 weeks.

Example 2

Coating of a substrate with nanographene. Samples of EPDM rubber (EPDM 1064) and AFLAS were first corona treated for at least 1 min and then dip coated sequentially in a 0.1 wt % aqueous solution of polyethylenimine (branched, Mw=ca. 25,000 by light scattering, Mn=ca. 10,000 by GPC, available from Aldrich, Cat no. 40, 872-7), a 0.2 wt % aqueous solution of poly(acrylic acid) (Mw=ca. 100,000, 35 wt % solution in water; available from Aldrich, Cat. No 52, 392-5), and 0.1 wt % aqueous solution of polyethyleneimine (same as above), followed by dip coating in a 0.01 wt % dispersion of the nanographene oxide of Example 1. For the EPDM sample, a total of 80 coats were applied in this manner; similarly, for the AFLAS samples, one sample was coated with 20 coats and a second sample was coated with 80 coats.

Figure 8:
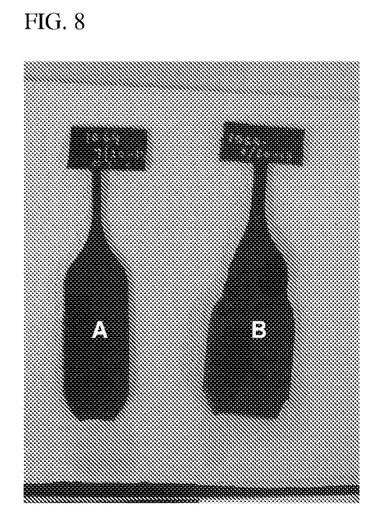
FIG. 8 is a photograph showing (A) a polymeric article coated with a nano-coating, and (B) an uncoated polymeric article, after being dipped in oil at room temperature for 24 hours.

Evaluation of nano-coated and uncoated EPDM samples. The coated EPDM 1064 samples (sample A in FIG. 8) having the nanographene coating, and the EPDM sample without nanographene coating (sample B in FIG. 8), were immersed in hydrotreated petroleum distillate (LVT-200 oil, available from Delta Drilling Products) at ambient temperature, the weight of the articles were measured at intervals of 2, 4, 6, 8, and 24 hours, and the changes in weight percent in each sample were calculated. FIG. 8 shows the aftereffects of the immersion of the sample in LVT-200 oil for 24 hours, where sample B without the nano-coating is visibly more swollen than the nano-coated sample (sample A).

Figure 9:
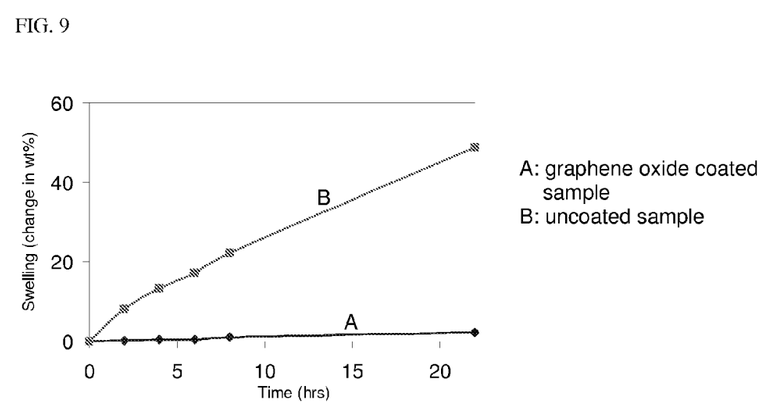
FIG. 9 is a plot of swelling (increase in weight percent) versus time for the nano-coated (A) and an uncoated (B) articles after being dipped in oil at room temperature.

As shown in the plot of swelling as measured by change in weight percent versus time (in hours) in FIG. 9, the nanographene coating substantially slows the uptake of oil and the swelling of the EPDM rubber (curve A) relative to the uncoated sample (curve B) which shows a steady increase in swelling without a plateau being reached. Under the conditions tested, the nanographene oxide coating retards EPDM rubber swelling in presence of oil by 95% after 24 hrs, calculated relative to the uncoated EPDM sample (i.e., where the nano-coated sample A swells by about 5% relative to 100% swelling in the uncoated sample B).

Figure 10:
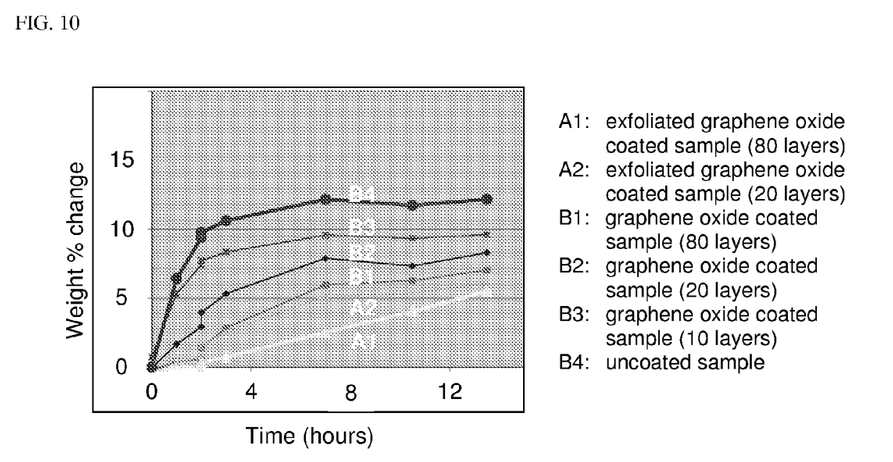
FIG. 10 is a plot of change in weight percent versus time for a nano-coated article having 80 layers (A1), a nano-coated article having 20 layers (A2) and an uncoated article (B), after being dipped in oil at an elevated temperature (143° C.).

FIG. 10 shows a comparison of weight percent change versus oil immersion time for the nano-coated AFLAS samples (sample A1 with 80 layers of nanographene, and sample A2 with 20 layers of nanographene), along with comparative AFLAS samples prepared using nanographite without exfoliation but derivatized by oxidation under the same conditions described for the exfoliated nanographene, in which sample B1 was coated with 80 layers of the unexfoliated, oxidized graphene, sample B2 was coated with 20 layers, sample B3 was coated with 10 layers, and sample B4 was prepared without a nanographene coating. Each was immersed in hydrotreated petroleum distillate (LVT-200 oil, available from Delta Drilling Products) at ambient temperature, the weight of the articles were measured at intervals of 1, 2, 3, 7, 10, and 14 hours, and the changes in weight percent in each sample were calculated. In the coated AFLAS samples, as shown in the plot of weight percent change versus time in FIG. 10, the mass uptake of nano-coated AFLAS samples A1 and A2 in LVT 200 oil at 143° C. (290° F.) is significantly slower than that of the uncoated AFLAS sample B4, and improved over unexfoliated graphene samples B1-B3. Under the conditions tested, the exfoliated nanographene oxide coating retards AFLAS swelling in presence of oil at elevated temperature (143° C.) by 52% after 14 hours, relative to the uncoated AFLAS sample B4 (i.e., where the nano-coated sample A1 swells by about 48% relative to 100% swelling in the uncoated sample B4). Further, it can be seen that the increased number of coatings in sample A1 (80 coats) provides enhanced protection of about 10-15% relative to the sample A2 with fewer coats of nano-coating (20 coats).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A method of forming a nano-coating on a substrate, comprising:
   A) depositing a first layer on a surface of the substrate, the first layer comprising a polymeric composition;
   B) depositing a second layer on the surface of the first layer opposite the substrate, the second layer comprising nanographene derivatized with a functional group selected from the group consisting of carboxy, epoxy, ether, ketone, amine, hydroxyl, alkoxy, alkyl, lactones, aryl, functionalized polymeric, functionalized oligomeric groups, and combinations thereof;
   the first layer having a positive or negative charge, the second layer having a positive or negative charge not identical to the charge of the first layer, and the substrate being neutral or having a charge opposite that of the first layer; and
   C) repeating steps A) and B), such that multiple alternating layers are formed,
   wherein each successive occurrence of the first layer is deposited on a previously deposited occurrence of the second layer.

2. A method of forming a nano-coating on a substrate, comprising:
   A) depositing a first layer on a surface of the substrate, the first layer comprising a polymeric composition;
   B) depositing a second layer on the surface of the first layer opposite the substrate, the second layer comprising nanographene derivatized with a functional group selected from the group consisting of carboxy, epoxy, ether, ketone, amine, hydroxyl, alkoxy, alkyl, lactones, aryl, functionalized polymeric, functionalized oligomeric groups, and combinations thereof; and
   C) repeating steps A) and B), such that multiple alternating layers are formed,
   wherein each successive occurrence of the first layer is deposited on a previously deposited occurrence of the second layer, and the method further comprises treating the substrate by a corona treatment, organosilane treatment, or polymer-based primer treatment.

3. The method of claim 1, wherein the depositing comprises film casting, spin coating, dip coating, spray coating, layer-by-layer coating, or a combination comprising at least one of the forgoing.

4. The method of claim 1, wherein the nanographene is exfoliated by fluorination, acid intercalation, acid intercalation followed by thermal shock treatment, or a combination thereof.

5. The method of claim 1, wherein the substrate comprises fluoroelastomers, perfluoroelastomers, hydrogenated nitrile butyl rubber, ethylene-propylene-diene monomer (EPDM) rubber, silicones, epoxy, polyetheretherketone, bismaleimide, polyethylene, polyvinylalcohol, phenolic resins, nylons, polycarbonates, polyurethanes, tetrafluoroethylene-propylene elastomeric copolymers, iron, steel, chrome alloys, hastelloy, titanium, molybdenum, or a combination thereof.

6. The method of claim 1, wherein the first layer is a positively charged binder layer, comprising a polyethyleneamine, a polyethyleneimine, a hyperbranched polyamine, a dendrimeric polyamine, a polyaminoacrylate, a polyaminoacrylate copolymer, or combinations thereof; or wherein the first layer is a negatively charged binder layer comprising polycarboxylic acids, salts of polycarboxylic acids, a polycarboxylic acid copolymer, or combinations thereof.

7. The method of claim 6, wherein the binder layer is the negatively charged binder layer which comprises polyacrylic acid.

8. The method of claim 6, wherein the binder layer is the positively charged binder layer which comprises polyethyleneimine.

9. The method of claim 1, wherein the first layer comprises a binder material which forms interparticle bonds with the derivatized nanographene.

10. The method of claim 1, wherein the second layer further comprises a nanofiller comprising fullerenes, nanographite, graphene oxide, nanotubes, nanodiamonds, polysilsesquioxanes, or a combination thereof.

11. The method of claim 10, wherein the nanographene or nanofiller is coated with a metallic coating comprising Ni, Pd, Fe, Pt, an alloy thereof, or a combination thereof.

12. The method of claim 1, wherein the nanographene has an aspect ratio greater than or equal to 10.

13. A method of forming a nano-coating on a substrate, comprising:
   A) depositing a first layer on a surface of the substrate, the first layer comprising a polymeric composition;
   B) depositing a second layer on the surface of the first layer opposite the substrate, the second layer comprising nanographene derivatized with a functional group selected from the group consisting of carboxy, epoxy, ether, ketone, amine, hydroxyl, alkoxy, alkyl, lactones, aryl, functionalized polymeric, functionalized oligomeric groups, and combinations thereof; and
   C) repeating steps A) and B), such that multiple alternating layers are formed,
   wherein each successive occurrence of the first layer is deposited on a previously deposited occurrence of the second layer, and wherein the article is a packer element, a blow out preventer element, a torsional spring of a sub surface safety valve, a submersible pump motor protector bag, a blow out preventer element, a sensor protector, a sucker rod, an O-ring, a T-ring, a gasket, a pump shaft seal, a tube seal, a valve seal, a seal for an electrical component, an insulator for an electrical component, a seal for a drilling motor, or a seal for a drilling bit.

14. The method of claim 13, wherein the article is wholly or partially coated with the nano-coating.

* * * * *